(12) United States Patent  
Farid et al.

(10) Patent No.: US 7,747,954 B2  
(45) Date of Patent: Jun. 29, 2010

(54) METHOD AND SYSTEM FOR VIRTUAL PRIVATE NETWORK CONNECTIVITY VERIFICATION

(75) Inventors: Hamdy Mahmoud Farid, Kanata (CA); Satvinder Singh Bawa, Ottawa (CA); Susan Patricia Callow, Kanata (CA)

(73) Assignee: Alcatel Lucent, Paris (FR)

( * ) Notice: Subject to any disclaimer, the term of this patent is extended or adjusted under 35 U.S.C. 154(b) by 336 days.

(21) Appl. No.: 11/386,809

(22) Filed: Mar. 23, 2006

(65) Prior Publication Data

US 2007/0226630 A1 Sep. 27, 2007

(51) Int. Cl.  
*G06F 15/177* (2006.01)
(52) U.S. Cl. .............. 715/736; 715/734; 715/735; 709/224; 714/46
(58) Field of Classification Search ......... 715/734–737; 709/223, 220, 224; 718/100; 714/1, 4, 25, 714/46–48, 699, 716, 717  
See application file for complete search history.

(56) References Cited

U.S. PATENT DOCUMENTS

| | | | |
|---|---|---|---|
| 6,577,327 B1 * | 6/2003 | Rochford et al. ............ | 715/735 |
| 6,816,462 B1 * | 11/2004 | Booth et al. ................ | 370/248 |
| 7,000,014 B2 * | 2/2006 | Poisson et al. ............. | 709/224 |
| 7,181,360 B1 * | 2/2007 | Nikolac et al. ............. | 702/119 |
| 7,283,563 B1 * | 10/2007 | Allan .......................... | 370/469 |
| 2002/0186664 A1 * | 12/2002 | Gibson et al. ............... | 370/254 |
| 2003/0087629 A1 * | 5/2003 | Juitt et al. ................... | 455/411 |
| 2003/0097438 A1 * | 5/2003 | Bearden et al. ............. | 709/224 |
| 2004/0066747 A1 * | 4/2004 | Jorgensen et al. ........... | 370/241 |
| 2004/0093492 A1 * | 5/2004 | Daude et al. ................ | 713/156 |
| 2005/0022189 A1 * | 1/2005 | Proulx et al. ................ | 718/100 |
| 2007/0028297 A1 * | 2/2007 | Troyansky et al. .......... | 726/2 |
| 2007/0140135 A1 * | 6/2007 | Sheppard .................... | 370/250 |
| 2008/0091803 A1 * | 4/2008 | Liu ............................. | 709/223 |

FOREIGN PATENT DOCUMENTS

CN 1700654 * 11/2005

OTHER PUBLICATIONS

E. Rosen, BGP/MPLS IP Virtual Private Networks (VPNs), Rosen & Rekhter, Standards Track, Feb. 2006, Cisco Systems, 1-47.

* cited by examiner

*Primary Examiner*—Ba Huynh  
*Assistant Examiner*—Enrique W Iturralde  
(74) *Attorney, Agent, or Firm*—Kramer & Amado P.C.

(57) ABSTRACT

A method for testing connectivity of virtual private networks, the virtual private networks including customer edge routers and provider edge routers, the provider edge routers belonging to a network managed by a service provider, the method comprising: displaying a list of the virtual private networks on a display screen of a network management system for the network; receiving a signal from a user to select a virtual private network from the list of the virtual private networks, the virtual private network having a topology, an import route target, and an export route target associated therewith; generating a list of operations to test connectivity of the virtual private network from the topology, the import route target, and the export route target; displaying the list of operations to the user on the display screen; receiving a signal from the user to select an operation from the list of operations, the operation having a source provider edge router and a destination provider edge network associated therewith; and, transmitting a message from the network management system to the source provider edge router to perform the operation.

14 Claims, 6 Drawing Sheets

METHOD AND SYSTEM FOR VIRTUAL PRIVATE NETWORK CONNECTIVITY VERIFICATION

FIELD OF THE INVENTION

This invention relates to the virtual private networks, and more specifically, to a method and system for verifying connectivity for virtual private networks.

BACKGROUND OF THE INVENTION

A virtual private network ("VPN") is a network that uses a public telecommunication infrastructure, such as the Internet, to provide remote offices or individual users with secure access to their organization's network. A virtual private network can be contrasted with an expensive system of owned or leased lines that can only be used by one organization. The goal of a VPN is to provide the organization with the same capabilities, but at a much lower cost. A VPN works by using the shared public infrastructure while maintaining privacy through security procedures and tunnelling protocols. In effect, the protocols, by encrypting data at the sending end and decrypting it at the receiving end, send the data through a "tunnel" that cannot be "entered" by data that is not properly encrypted. An additional level of security involves encrypting not only the data, but also the originating and receiving network addresses. Thus, a VPN is a form of private network that uses a public network (usually the Internet) to connect remote sites or users together. Instead of using a dedicated, real-world connection such as leased line, a VPN uses "virtual" connections routed through the Internet from the company's private network to the remote site or employee.

A Layer 3 VPN ("L3VPN") interconnects set of hosts and routers based on Layer 3 addresses. The widely-adopted Open Standards Interconnection ("OSI") model defines seven layers of interconnection. Layer 3 ("L3") is the network layer. It determines how data is transferred between computers. It also addresses routing within and between individual networks. The Internet Protocol ("IP"), for example, is used in gateways to connect networks at L3 and above. The IP is part of the Transmission Control Protocol/Internet Protocol ("TCP/IP") family of protocols describing software that tracks the Internet address of nodes, routes outgoing messages, and recognizes incoming messages.

For reference, a method by which a Service Provider ("SP") may use an IP backbone to provide L3VPNs (or IP VPNs) for its customers is described in Request for Comments ("RFC") 4364 (RFC 4364, "BGP/MPLS IP Virtual Private Networks (VPNs)", The Internet Society, February 2006), which is incorporated herein by reference. This method uses a "peer model", in which the customers' edge routers ("CE routers") send their routes to the SP's edge routers ("PE routers"). The Border Gateway Protocol ("BGP") is then used by the SP to exchange the routes of a particular VPN among the PE routers that are attached to that VPN. This is done in a way that ensures that routes from different VPNs remain distinct and separate, even if two VPNs have an overlapping address space. The PE routers distribute, to the CE routers in a particular VPN, the routes from other CE routers in that VPN. The CE routers do not peer with each other, hence there is no "overlay" visible to the VPN's routing algorithm. The term "IP" in "IP VPN" is used to indicate that the PE receives IP datagrams from the CE, examines their IP headers, and routes them accordingly. Each route within a VPN is assigned a Multiprotocol Label Switching ("MPLS") label. When BGP distributes a VPN route, it also distributes an MPLS label for that route. Before a customer data packet travels across the SP's backbone, it is encapsulated with the MPLS label that corresponds, in the customer's VPN, to the route that is the best match to the packet's destination address. This MPLS packet is further encapsulated (e.g., with another MPLS label or with an IP or Generic Routing Encapsulation ("GRE") tunnel header) so that it gets tunnelled across the backbone to the proper PE router. Thus, the backbone core routers do not need to know the VPN routes. The primary goal of this method is to support the case in which a client obtains IP backbone services from a SP or SPs with which it maintains contractual relationships. The client may be an enterprise, a group of enterprises that need an extranet, an Internet Service Provider, an application service provider, another VPN SP that uses this same method to offer VPNs to clients of its own, etc. The method makes it very simple for the client to use the backbone services. It is also very scalable and flexible for the SP, and allows the SP to add value.

In networks running RFC 4364 (or it predecessor RFC 2547) VPNs, PE routers maintain virtual routing and forwarding tables ("VRFs"). A VRF is a per-site forwarding table. Every site to which the PE router is attached is associated with one of these tables. A particular packet's IP destination address is looked up in a particular VRF only if that packet has arrived directly from a site that is associated with that table.

Now, customers are becoming increasingly concerned about security as more L3VPN services are rolled out by SPs and as the number of customer private networks that share the same provider core network increases. In general, the larger a customer is, the greater the number of interfaces "connected" to the VPN. However, increasing the number of interfaces makes it more difficult to ensure traffic flow or connectivity between all members of the VPN.

To test connectivity in a network, a "ping" operation may be used. A ping operation sends an echo request packet to an address, and then awaits a reply. The result of the ping operation can help SPs evaluate path-to-host reliability, delays over the path, and whether the host can be reached or is functioning. The ping operation is based on Internet Control Message Protocol ("ICMP") traffic and it uses public routing tables in order to get to the required destination (if it exists). In a VPN, when attempting to ping from a PE router to a CE router, or from a PE router to PE router, the standard ping operations will not work. Accordingly, "ping VRF" operations are used to ping the IP addresses of LAN interfaces on CE routers. A ping VRF operation is the same as a standard ping operation except that it uses private VPN routing and forwarding tables (i.e., VRFs) instead of public routing tables.

When provisioning medium and large scale L3VPN services, the task of making sure all the connected members are up and running is complex and time consuming. For example, for a VPN with 100 interfaces distributed across 10 VRFs, the number of "ping VRF" operations required to confirm connectivity is 10*90 or 900 operations. Conducting such operations manually is time consuming and the risk to making an error increases with increases in the size of the VPN.

In addition, when provisioning multiple L3VPN services on the same core network, "traffic leak" may occur if provisioning errors are made. For example, consider two customers each having a respective VPN. These networks share the same network core but are supposed to operate separately. If a VPN site that is supposed to be configured for operation on the first customer's VPN is erroneously configured for operation on the second company's VPN, then a traffic leak has occurred in that the site will have access to information on the second company's VPN that it is not supposed to have. In other words, the security of the VPN has been jeopardized. Accordingly, it is important to ensure for customers sharing the same core that VPN traffic stays within its own VPN. To ensure that there is no traffic leak, every "connected" interface in the customer VPN has to be pinged from all the other VRFs which don't belong to that VPN. Again, the higher the number of interfaces in the VPN (and in the other VPNs), the more difficult testing for traffic leak becomes. For example, for two VPNs each having 100 interfaces distributed across 10 VRFs, the number of ping VRF operations that need to be performed is 10*100+10*100=2000 operations.

Thus, connectivity and security are two problems SPs face when providing L3VPN services to their customers.

A need therefore exists for an improved method and system for verifying connectivity in virtual private networks. Accordingly, a solution that addresses, at least in part, the above and other shortcomings is desired.

SUMMARY OF THE INVENTION

According to one aspect of the invention, there is provided a method for testing connectivity of virtual private networks, the virtual private networks including customer edge routers and provider edge routers, the provider edge routers belonging to a network managed by a service provider, the method comprising: displaying a list of the virtual private networks on a display screen of a network management system for the network; receiving a signal from a user to select a virtual private network from the list of the virtual private networks, the virtual private network having a topology, an import route target, and an export route target associated therewith; generating a list of operations to test connectivity of the virtual private network from the topology, the import route target, and the export route target; displaying the list of operations to the user on the display screen; receiving a signal from the user to select an operation from the list of operations, the operation having a source provider edge router and a destination provider edge network associated therewith; and, transmitting a message from the network management system to the source provider edge router to perform the operation.

In the above method, the operation may be a ping VRF operation. The method may further include receiving results of the operation from the source provider edge router and displaying the results on the display screen of the network management system. The method may further include receiving a signal from the user to initiate the operation. The method may further include receiving a signal from the user to schedule initiation of the operation. The virtual private network may be a first virtual private network and a second virtual private network and the list of operations to test connectivity of the virtual private network may be a list of operations to test negative connectivity between the first and second virtual private networks. The topology may be one of a mesh topology and a hub and spoke topology. The virtual private networks may be Internet Protocol based virtual private networks (e.g., L3VPNs). And, the network management system may be located remotely from the provider edge routers.

In accordance with further aspects of the present invention there is provided an apparatus such as a data processing system (e.g., a NMS), a method for adapting this system, as well as articles of manufacture such as a computer readable medium having program instructions recorded thereon for practising the method of the invention.

BRIEF DESCRIPTION OF THE DRAWINGS

Further features and advantages of the embodiments of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENTS

In the following description, details are set forth to provide an understanding of the invention. In some instances, certain software, circuits, structures and techniques have not been described or shown in detail in order not to obscure the invention. The term "data processing system" is used herein to refer to any machine for processing data, including the network devices, routers, and network management systems described herein. The present invention may be implemented in any computer programming language provided that the operating system of the data processing system provides the facilities that may support the requirements of the present invention. Any limitations presented would be a result of a particular type of operating system or computer programming language and would not be a limitation of the present invention.

Figure 1:
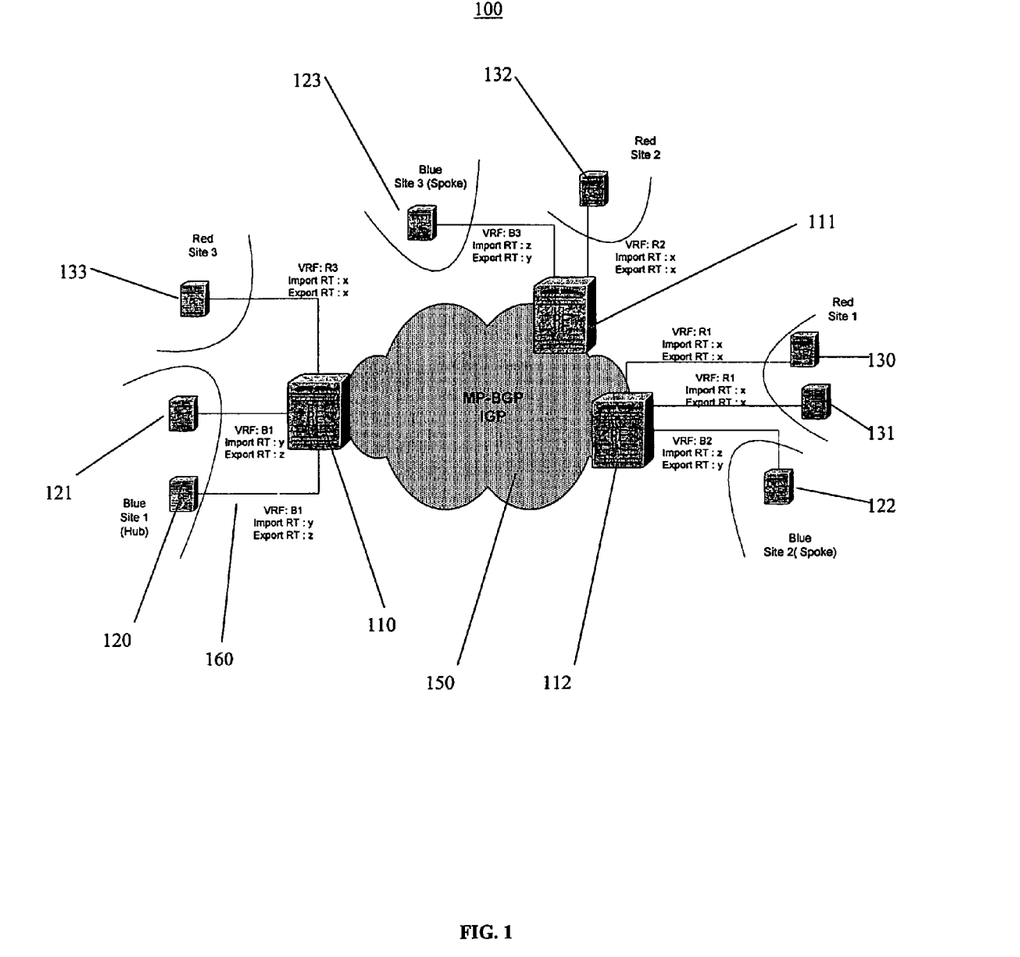
FIG. 1 is a block diagram illustrating a communications network having two virtual private networks in accordance with an embodiment of the invention.

FIG. 1 is a block diagram illustrating a communications network 100 having two virtual private networks ("VPNs") Blue, Red in accordance with an embodiment of the invention. The VPNs Blue, Red share a common network core or backbone 150. The communications network 100 includes an number of PE routers 110, 111, 112 and CE routers 120, 121, 122, 123, 130, 131, 132, 133. The routers 110, 111, 112, 120, 121, 122, 123, 130, 131, 132, 133 are coupled to a network management system ("NMS") 300 for configuring (and provisioning, controlling, monitoring, etc.) each router for operation on the network 100. Each CE router (e.g., 120) is connected to a PE router (e.g., 110) through an attachment circuit 160. The first VPN Blue has a hub and spoke topology and includes three sites Blue Site 1 (hub), Blue Site 2 (spoke), Blue Site 3 (spoke). The second VPN Red has a mesh topology and also includes three sites Red Site 1, Red Site 2, Red Site 3.

For reference, routers can be attached to each other, or to end systems, in a variety of different ways. The term "attachment circuit" (see 160) refers generally to a means of attaching to a router. An attachment circuit may be the sort of connection that is usually thought of as a "data link", or it may be a tunnel of some sort. It enables for two devices (e.g., 110, 120) to be network layer (i.e., L3) peers over the attachment circuit.

Each VPN site (e.g., Blue Site 1) contains one or more customer edge ("CE") devices (e.g., 120, 121). Each CE device (e.g., 120) is attached, via some sort of attachment circuit 160, to one or more provider edge ("PE") routers (e.g., 110). CE devices (e.g., 120, 121) can be hosts or routers. In a typical case, a site (e.g., Blue Site 1) contains one or more routers (e.g., 120, 121), some of which are attached to PE routers (e.g., 110). The site routers that attach to the PE routers would then be the CE devices, or "CE routers". However, there is nothing to prevent a non-routing host from attaching directly to a PE router, in which case the host would be a CE device.

The attachment circuit 160 over which a packet travels when going from CE 120 to PE 110 is known as that packet's "ingress attachment circuit", and the PE 110 as the packet's "ingress PE". The attachment circuit 160 over which a packet travels when going from PE 110 to CE 120 is known as that packet's "egress attachment circuit", and the PE 110 as the packet's "egress PE". We will say that a PE router 110 is attached to a particular VPN Blue Site 1 if it is attached to a CE device 120 that is in a site of that VPN. Similarly, we will say that a PE router 110 is attached to a particular site Blue Site 1 if it is attached to a CE device 120 that is in that site.

The SP's backbone 150 consists of the PE routers 110, 111, 112, as well as other routers (not shown) that do not attach to CE devices. From the perspective of a particular backbone network 150, a set of IP systems (e.g., 120, 121) may be regarded as a "site" if those systems have mutual IP interconnectivity that doesn't require use of the backbone 150. In general, a site will consist of a set of systems that are in geographic proximity. A CE device (e.g., 120) is always regarded as being in a single site (e.g., Blue Site 1). A site, however, may belong to multiple VPNs. A PE router may attach to CE devices from any number of different sites, whether those CE devices are in the same or in different VPNs. A CE device may, for robustness, attach to multiple PE routers, of the same or of different SPs. If the CE device is a router, the PE router and the CE router will appear as router adjacencies to each other.

Each PE router (e.g., 110) maintains a number of separate forwarding tables. One of the forwarding tables is the "default forwarding table". The others are "VPN Routing and Forwarding tables", or "VRFs" (e.g., B1, R3). Every PE/CE attachment circuit (e.g., 160) is associated, by configuration, with one or more VRFs (e.g., B1). An attachment circuit that is associated with a VRF is known as a "VRF attachment circuit". In the simplest case and most typical case, a PE/CE attachment circuit is associated with exactly one VRF. When an IP packet is received over a particular attachment circuit, its destination IP address is looked up in the associated VRF. The result of that lookup determines how to route the packet. The VRF used by a packet's ingress PE for routing a particular packet is known as the packet's "ingress VRF". There is also the notion of a packet's "egress VRF", located at the packet's egress PE. If an IP packet arrives over an attachment circuit that is not associated with any VRF, the packet's destination address is looked up in the default forwarding table, and the packet is routed accordingly. Packets forwarded according to the default forwarding table include packets from neighbouring PE routers, as well as packets from customer-facing attachment circuits that have not been associated with VRFs. Intuitively, one can think of the default forwarding table as containing "public routes", and of the VRFs as containing "private routes". One can similarly think of VRF attachment circuits as being "private", and of non-VRF attachment circuits as being "public". If a particular VRF attachment circuit 160 connects a site Blue Site 1 to a PE router 110, then connectivity from that site (via that attachment circuit) can be restricted by controlling the set of routes that gets entered in the corresponding VRF B1. The set of routes in that VRF should be limited to the set of routes leading to sites that have at least one VPN in common with the site. Then a packet sent from the site over a VRF attachment circuit can only be routed by the PE to a second site if the second site is in one of the same VPNs as the site. That is, communication (via PE routers) is prevented between any pair of VPN sites that have no VPN in common. Communication between VPN sites and non-VPN sites is prevented by keeping the routes to the VPN sites out of the default forwarding table. If there are multiple attachment circuits leading from a site to one or more PE routers, then there might be multiple VRFs that could be used to route traffic from the site. To properly restrict the site's connectivity, the same set of routes would have to exist in all the VRFs. Alternatively, one could impose different connectivity restrictions over different attachment circuit from the site. In that case, some of the VRFs associated with attachment circuits from the site would contain different sets of routes than some of the others.

When a PE router 110 receives a packet from a CE device 120, it must determine the attachment circuit 160 over which the packet arrived, as this determines in turn the VRF (or set of VRFs) B1 that can be used for forwarding that packet. In general, to determine the attachment circuit 160 over which a packet arrived, a PE router 110 takes note of the physical interface over which the packet arrived.

With respect to populating a VRF with a set of routes, consider the following example. Suppose that PE 110 learns, from CE 120, the routes that are reachable at CE 120's site Blue Site 1. If PE 111 and PE 112 are attached, respectively, to CE 123 and CE 122, and VPN Blue contains CE 120, CE 123, and CE 122, then PE 110 uses BGP to distribute to PE 111 and PE 112 the routes that it has learned from CE 110. PE 111 and PE 112 use these routes to populate the VRFs B3, B2 that they associate, respectively, with the sites Blue Site 3, Blue Site 2 of CE 123 and CE 122. Routes from sites (e.g., Red Site 3) that are not in VPN Blue do not appear in these VRFs B1, B2, B3, which means that packets from CE 112 or CE 123 cannot be sent to sites that are not in the VPN Blue. When we speak of a PE "learning" routes from a CE, we are not presupposing any particular learning technique. The PE may learn routes by means of a dynamic routing algorithm, but it may also "learn" routes by having those routes configured (i.e., static routing).

If there are multiple attachment circuits leading from a particular PE router to a particular site, they might all be mapped to the same forwarding table. But if policy dictates, they could be mapped to different forwarding tables. For instance, the policy might be that a particular attachment circuit from a site is used only for intranet traffic, while another attachment circuit from that site is used only for extranet traffic. In this case, the two attachment circuits would be associated with different VRFs. Note that if two attachment circuits are associated with the same VRF, then packets that the PE receives over one of them will be able to reach exactly the same set of destinations as packets that the PE receives over the other. So two attachment circuits cannot be associated with the same VRF unless each CE is in the exact same set of VPNs as is the other. If an attachment circuit leads to a site which is in multiple VPNs, the attachment circuit may still be associated with a single VRF, in which case the VRF will contain routes from the full set of VPNs of which the site is a member.

PE routers use BGP to distribute VPN routes to each other (more accurately, to cause VPN routes to be distributed to each other). Each VPN has its own address space, which means that a given address may denote different systems in different VPNs. If two routes to the same IP address prefix are actually routes to different systems, it is important to ensure that BGP not treat them as comparable. Otherwise, BGP might choose to install only one of them, making the other system unreachable. Further, we must ensure that policy is used to determine which packets get sent on which routes; given that several such routes are installed by BGP, only one such must appear in any particular VRF. These goals are met by the use of an address family, as described below.

The BGP Multiprotocol Extensions ("BGP-MP") allow BGP to carry routes from multiple "address families". A VPN-IPv4 address is a 12-byte quantity, beginning with an 8-byte Route Distinguisher ("RD") and ending with a 4-byte IPv4 address. If several VPNs use the same IPv4 address prefix, the PEs translate these into unique VPN-IPv4 address prefixes. This ensures that if the same address is used in several different VPNs, it is possible for BGP to carry several completely different routes to that address, one for each VPN. Since VPN-IPv4 addresses and IPv4 addresses are different address families, BGP never treats them as comparable addresses. An RD is simply a number, and it does not contain any inherent information; it does not identify the origin of the route or the set of VPNs to which the route is to be distributed. The purpose of the RD is solely to allow one to create distinct routes to a common IPv4 address prefix. Other means are used to determine where to redistribute the route. The RD can also be used to create multiple different routes to the very same system. The RDs are structured so that every SP can administer its own "numbering space" (i.e., can make its own assignments of RDs), without conflicting with the RD assignments made by any other SP.

Thus, a RD is an 8-byte value that, together with a 4 byte IPv4 address, identifies a VPN-IPv4 address family. If two VPNs use the same IPv4 address prefix, the PEs translate these into unique VPN-IPv4 address prefixes. This ensures that if the same address is used in two different VPNs, it is possible to install two completely different routes to that address, one for each VPN.

In more detail, an RD consists of three fields: a 2-byte type field, an administrator field, and an assigned number field. The value of the type field determines the lengths of the other two fields, as well as the semantics of the administrator field. The administrator field identifies an assigned number authority, and the assigned number field contains a number that has been assigned, by the identified authority, for a particular purpose. For example, one could have an RD whose administrator field contains an Autonomous System number ("ASN"), and whose (4-byte) number field contains a number assigned by the SP to whom that ASN belongs (having been assigned to that SP by the appropriate authority). RDs are given this structure in order to ensure that an SP that provides VPN backbone service can always create a unique RD when it needs to do so. However, the structure is not meaningful to BGP; when BGP compares two such address prefixes, it ignores the structure entirely. A PE needs to be configured such that routes that lead to a particular CE become associated with a particular RD. The configuration may cause all routes leading to the same CE to be associated with the same RD, or it may cause different routes to be associated with different RDs, even if they lead to the same CE.

As mentioned, a VPN-IPv4 address consists of an 8-byte RD followed by a 4-byte IPv4 address. The RDs are encoded as follows: Type Field—2 bytes; and, Value Field—6 bytes. The interpretation of the value field depends on the value of the type field. At the present time, three values of the type field are defined: 0, 1, and 2. For Type 0, the value field consists of two subfields: administrator subfield—2 bytes; and, assigned number subfield—4 bytes. The administrator subfield must contain an ASN number. If this ASN is from the public ASN space, it must have been assigned by the appropriate authority (use of ASN values from the private ASN space is strongly discouraged). The assigned number subfield contains a number from a numbering space that is administered by the enterprise to which the ASN has been assigned by an appropriate authority. For Type 1, the value field consists of two subfields: administrator subfield—4 bytes; and, assigned number subfield—2 bytes. The administrator subfield must contain an IP address. If this IP address is from the public IP address space, it must have been assigned by an appropriate authority (use of addresses from the private IP address space is strongly discouraged). The assigned number subfield contains a number from a numbering space which is administered by the enterprise to which the IP address has been assigned. For Type 2, the value field consists of two subfields: administrator subfield—4 bytes; and, assigned number subfield—2 bytes. The administrator subfield must contain a 4-byte ASN number. If this ASN is from the public ASN space, it must have been assigned by the appropriate authority (use of ASN values from the private ASN space is strongly discouraged). The assigned number subfield contains a number from a numbering space which is administered by the enterprise to which the ASN has been assigned by an appropriate authority.

If a PE router is attached to a particular VPN (by being attached to a particular CE in that VPN), it learns some of that VPN's IP routes from the attached CE router. Routes learned from a CE routing peer over a particular attachment circuit may be installed in the VRF associated with that attachment circuit. Exactly which routes are installed in this manner is determined by the way in which the PE learns routes from the CE. In particular, when the PE and CE are routing protocol peers, this is determined by the decision process of the routing protocol. These routes are then converted to VPN-IP4 routes, and "exported" to BGP. If there is more than one route to a particular VPN-IP4 address prefix, BGP chooses the "best" one, using the BGP decision process. That route is then distributed by BGP to the set of other PEs that need to know about it. At these other PEs, BGP will again choose the best route for a particular VPN-IP4 address prefix. Then the chosen VPN-IP4 routes are converted back into IP routes, and "imported" into one or more VRFs. Whether they are actually installed in the VRFs depends on the decision process of the routing method used between the PE and those CEs that are associated with the VRF in question. Finally, any route installed in a VRF may be distributed to the associated CE routers.

Every VRF is associated with one or more Route Target ("RT") attributes. When a VPN-IPv4 route is created (from an IPv4 route that the PE has learned from a CE) by a PE router, it is associated with one or more RT attributes. These are carried in BGP as attributes of the route. Any route associated with RT "T" must be distributed to every PE router that has a VRF associated with RT "T". When such a route is received by a PE router, it is eligible to be installed in those of the PE's VRFs that are associated with RT "T". (Whether it actually gets installed depends upon the outcome of the BGP decision process, and upon the outcome of the decision process of the Interior Gateway Protocol ("IGP") (i.e., the intra-domain routing protocol) running on the PE/CE interface.)

A RT attribute can be thought of as identifying a set of sites. (Though it would be more precise to think of it as identifying a set of VRFs.) Associating a particular RT attribute with a route allows that route to be placed in the VRFs that are used for routing traffic that is received from the corresponding sites. A RT attribute is also a BGP extended community. A RT community is used to constrain VPN information distribution to the set of VRFs. A RT can be perceived as identifying a set of sites or, more precisely, a set of VRFs.

There is a set of RTs that a PE router attaches to a route received from a site (e.g., Blue Site 1); these may be called the "Export Targets" or "Export RTs" (e.g., z). And, there is a set of RTs that a PE router uses to determine whether a route received from another PE router could be placed in the VRF (e.g., B1) associated with the site (e.g., Blue Site 1); these may be called the "Import Targets" or "Import RTs" (e.g., y). The two sets are distinct, and need not be the same. Note that a particular VPN-IPv4 route is only eligible for installation in a particular VRF if there is some RT that is both one of the route's RTs and one of the VRF's Import RTs.

The function performed by the RT attribute is similar to that performed by the BGP Communities attribute. However, the format of the latter is inadequate for present purposes, since it allows only a 2-byte numbering space. It is desirable to structure the format, similar to what we have described for RDs, so that a type field defines the length of an administrator field, and the remainder of the attribute is a number from the specified administrator's numbering space. This can be done using BGP Extended Communities. The RT discussed herein are encoded as BGP Extended Community Route Targets ("BGP-EXTCOMM"). They are structured similarly to the RDs.

When a BGP speaker has received more than one route to the same VPN-IPv4 prefix, the BGP rules for route preference are used to choose which VPN-IPv4 route is installed by BGP. Note that a route can only have one RD, but it can have multiple RTs. In BGP, scalability is improved if one has a single route with multiple attributes, as opposed to multiple routes. One could eliminate the RT attribute by creating more routes (i.e., using more RDs), but the scaling properties would be less favorable.

There are a number of different possible ways that a PE may determine which RT attributes to associate with a given route. The PE might be configured to associate all routes that lead to a specified site with a specified RT. Or the PE might be configured to associate certain routes leading to a specified site with one RT, and certain with another. If the PE and the CE are themselves BGP peers, then the SP may allow the customer, within limits, to specify how its routes are to be distributed. The SP and the customer would need to agree in advance on the set of RTs that are allowed to be attached to the customer's VPN routes. The CE could then attach one or more of those RTs to each IP route that it distributes to the PE. This gives the customer the freedom to specify in real time, within agreed-upon limits, its route distribution policies. If the CE is allowed to attach RTs to its routes, the PE must filter out all routes that contain RTs that the customer is not allowed to use. If the CE is not allowed to attach RTs to its routes, but does so anyway, the PE must remove the RT before converting the customer's route to a VPN-IPv4 route.

By setting up the Import RTs and Export RTs properly, one can construct different kinds of VPNs. Suppose it is desired to create a fully meshed closed user group (e.g., Red in FIG. 1), that is, a set of sites (e.g., Red Site 1, Red Site 2, Red Site 3 in FIG. 1) where each can send traffic directly to the other, but traffic cannot be sent to or received from other sites (e.g., Blue Site 1, Blue Site 2, Blue Site 3 in FIG. 1). Then each site (i.e., Red Site 1, Red Site 2, Red Site 3) is associated with a VRF (i.e., R1, R2, R3), a single RT attribute (e.g., x) is chosen, that RT is assigned to each VRF as both the Import RT and the Export RT, and that RT is not assigned to any other VRFs (i.e., B1, B2, B3) as either the Import RT or the Export RT. Alternatively, suppose one desired, for whatever reason, to create a "hub and spoke" kind of VPN (e.g., Blue in FIG. 1). This could be done by the use of two RT values, one meaning "Hub" and one meaning "Spoke". At the VRFs (i.e., B1) attached to the hub sites (i.e., Blue Site 1), "Hub" (i.e., z) is the Export RT and "Spoke" (i.e., y) is the Import RT. At the VRFs (i.e., B2, B3) attached to the spoke site (i.e., Blue Site 2, Blue Site 3), "Hub" (i.e., z) is the Import RT and "Spoke" (i.e., y) is the Export RT. Thus, the methods for controlling the distribution of routing information among various sets of sites are very flexible, which in turn provides great flexibility in constructing VPNs.

If the sub-interface connecting a PE router and a CE router is a "numbered" interface, the addresses assigned to the interface may come from either the address space of the VPN or the address space of the SP. If a CE router is being managed by the SP, then the SP will likely have a NMS 300 that needs to be able to communicate with the CE router. In this case, the addresses assigned to the sub-interface connecting the CE and PE routers should come from the SP's address space, and should be unique within that space. The NMS 300 should itself connect to a PE router (more precisely, be at a site that connects to a PE router) via a VRF interface. The address of the NMS 300 will be exported to all VRFs that are associated with interfaces to CE routers that are managed by the SP. The addresses of the CE routers will be exported to the VRF associated with the NMS 300, but not to any other VRFs. This allows communication between the CE and NMS 300, but does not allow any undesired communication to or among the CE routers. One way to ensure that the proper route import/ exports are done is to use two RTs; call them "T1" and "T2". If a particular VRF interface attaches to a CE router that is managed by the SP, then that VRF is configured to: import routes that have T1 attached to them; and, attach T2 to addresses assigned to each end of its VRF interfaces. If a particular VRF interface attaches to the SP's NMS 300, then that VRF is configured to attach T1 to the address of that system, and to import routes that have T2 attached to them. Note that a NMS 300 may control a network element via Simple Network Management Protocol ("SNMP") messages sent to the network element's control card rather than by using an in-band interface as described above.

Figure 2:
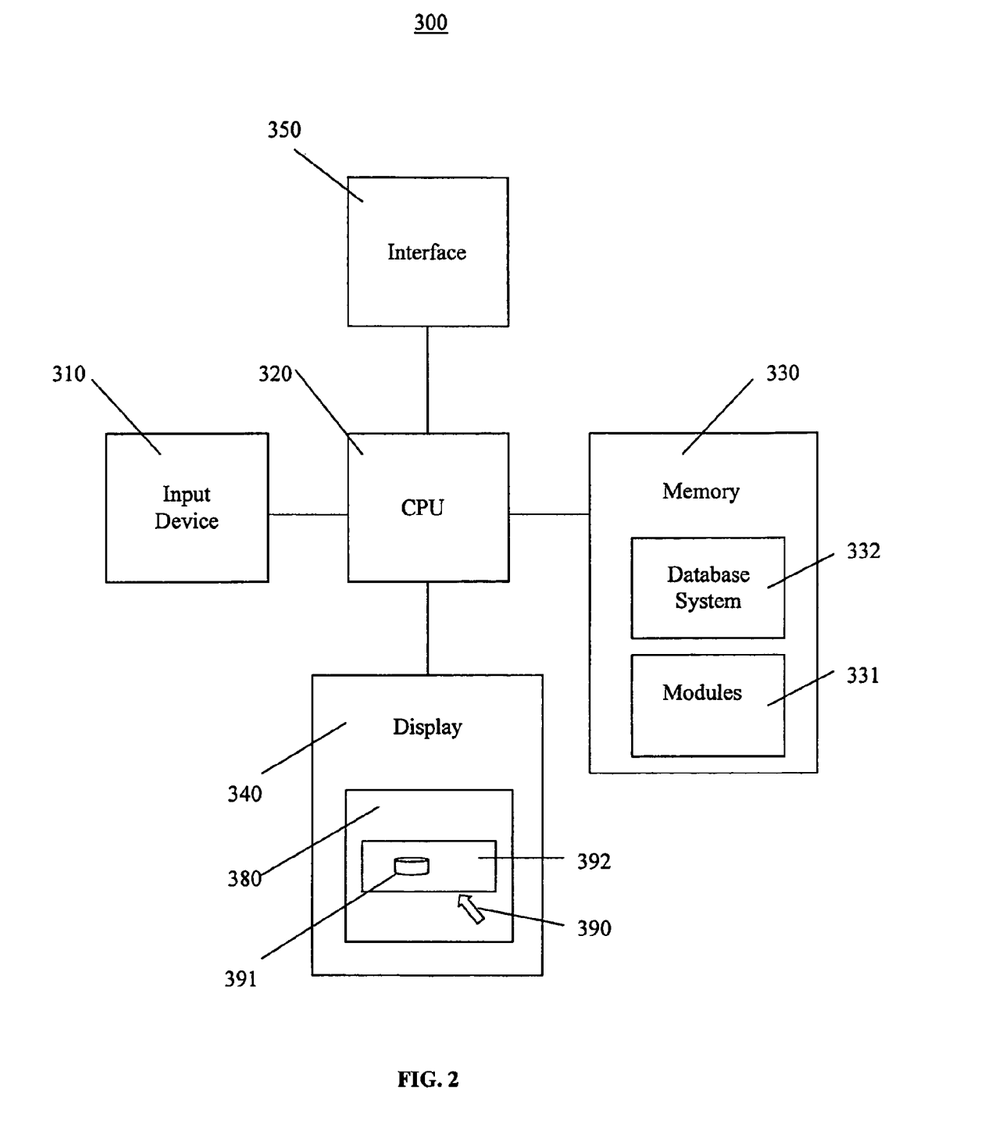
FIG. 2 is a block diagram illustrating a data processing system adapted to implement an embodiment of the invention.

FIG. 2 is a block diagram illustrating a data processing system 300 adapted to implement an embodiment of the invention. The data processing system 300 is suitable for operation as a NMS 300, PE router 110, CE router 120, or other network device in a communications network such as a L3VPN based network 100. The data processing system 300 includes a central processing unit ("CPU") 320, memory 330, and an interface device 350 and may optionally include an input device 310 and a display 340. The CPU 320 may include dedicated coprocessors and memory devices. The memory 330 may include RAM, ROM, disk devices, and databases. The interface device 350 may include a network connection (e.g., an IP based network connection). The input device 310 may include a keyboard, a mouse, a trackball, or a similar device. And, the display 340 may include a computer screen, terminal device, or a hardcopy producing output device such as a printer or plotter. The data processing system 300 is adapted for communicating with other data processing systems (e.g., 110, 120) over a network 100 via the interface device 350. The data processing system 300 may include a database system 332 for storing and accessing network topology and programming information. The database system 332 may include a database management system ("DBMS") and a database and may be stored in the memory 330 of the data processing system 300. The data processing system 300 has stored therein data representing sequences of instructions which when executed cause the method described herein to be performed. Of course, the data processing system 300 may contain additional software and hardware a description of which is not necessary for understanding the invention.

The data processing system 300 may be a server system or a personal computer ("PC") system. The CPU 320 of the system 300 is operatively coupled to memory 330 which stores an operating system (not shown) for general management of the system 300. The interface 350 may be used for communicating to external data processing systems (e.g., routers 110, 120 in FIG. 1) through a network (e.g., the L3VPN network 100 in FIG. 1. The system 300 may include application server software (not shown) for developing and managing distributed applications. The CPU 320 of the system 300 is typically coupled to one or more devices 310 for receiving user commands or queries and for displaying the results of these commands or queries to the user on a display 340. As mentioned, the memory 330 may include a variety of storage devices including internal memory and external mass storage typically arranged in a hierarchy of storage as understood to those skilled in the art.

A user may interact with the data processing system 300 and its hardware and software modules 331 using a graphical user interface ("GUI") 380. The GUI 380 may be used for monitoring, managing, and accessing the data processing system 300. GUIs are supported by common operating systems and provide a display format which enables a user to choose commands, execute application programs, manage computer files, and perform other functions by selecting pictorial representations known as icons, or items from a menu through use of an input or pointing device such as a mouse 310. In general, a GUI is used to convey information to and receive commands from users and generally includes a variety of GUI objects or controls, including icons, toolbars, drop-down menus, text, dialog boxes, buttons, and the like. A user typically interacts with a GUI 380 presented on a display 340 by using an input or pointing device (e.g., a mouse) 310 to position a pointer or cursor 390 over an object 391 and by "clicking" on the object 391.

Typically, a GUI based system presents application, system status, and other information to the user in "windows" appearing on the display 340. A window 392 is a more or less rectangular area within the display 340 in which a user may view an application or a document. Such a window 392 may be open, closed, displayed full screen, reduced to an icon, increased or reduced in size, or moved to different areas of the display 340. Multiple windows may be displayed simultaneously, such as: windows included within other windows, windows overlapping other windows, or windows tiled within the display area.

Thus, the data processing system 300 includes computer executable programmed instructions for directing the system 300 to implement the embodiments of the present invention. The programmed instructions may be embodied in one or more hardware modules or software modules 331 resident in the memory 330 of the data processing system 300. Alternatively, the programmed instructions may be embodied on a computer readable medium (such as a CD disk or floppy disk) which may be used for transporting the programmed instructions to the memory 330 of the data processing system 300. Alternatively, the programmed instructions may be embedded in a computer-readable signal or signal-bearing medium that is uploaded to a network by a vendor or supplier of the programmed instructions, and this signal or signal-bearing medium may be downloaded through an interface (e.g., 350) to the data processing system 300 from the network by end users or potential buyers.

As mentioned above, connectivity and security are two problems SPs face when providing L3VPN services to their customers. According to the present invention, instead of creating and performing the required tests for testing connectivity (i.e., connectivity and negative connectivity tests) manually, the NMS 300 is adapted to generate and schedule the operations necessary to perform these tests. Using a GUI 380 running on the NMS 300, a user can select a VPN service and generate all the required operations (i.e., ping VRF operations) to perform a connectivity test. In addition, the user can schedule the running of these tasks periodically or at a specific time to validate the connectivity of the VPN. Similarly, using the GUI 380, the user may select multiple VPNs and generate all the required operations (i.e., ping VRF operations) to perform a negative connectivity test between the VPNs. The user can schedule the running of these tasks periodically or at a specific time to validate the negative connectivity between the VPNs.

In a connectivity test, an attempt is made to access each site in the VPN from each other site in the VPN through ping VRF operations. Referring to FIG. 1, the second VPN Red has three sites Red Site 1, Red Site 2, Red Site 3. A connectively test for this VPN would include the following:

1. From Red Site 1: Attempt to access Red Site 2, Red Site 3, Red Site 1;
2. From Red Site 2: Attempt to access Red Site 3, Red Site 1, Red Site 2; and,
3. From Red Site 3: Attempt to access Red Site 1, Red Site 2, Red Site 3.

As the name implies, the negative connectivity test is the opposite of the connectivity test. It is used to confirm that no connectivity exists. In other words, it confirms that no traffic leaks exist between VPNs. The traffic leaks may result from errors made during the provisioning of routers in the VPNs. For example, for two VPNs Red, Blue sharing the same PE routers 110, 111, 112 and core 150, the negative connectivity test would include the following:

1. From Red Site 1: Attempt to access Blue Site 1, Blue Site 2, Blue Site 3;
2. From Red Site 2: Attempt to access Blue Site 1, Blue Site 2, Blue Site 3;
3. From Red Site 3: Attempt to access Blue Site 1, Blue Site 2, Blue Site 3.
4. From Blue Site 1: Attempt to access Red Site 1, Red Site 2, Red Site 3;
5. From Blue Site 2: Attempt to access Red Site 1, Red Site 2, Red Site 3; and,
6. From Blue Site 3: Attempt to access Red Site 1, Red Site 2, Red Site 3.

If all the outcomes of the ping VFR operations are failures, then the two VPNs Red, Blue are completely isolated and there is no chance of a traffic leak.

Figure 3:
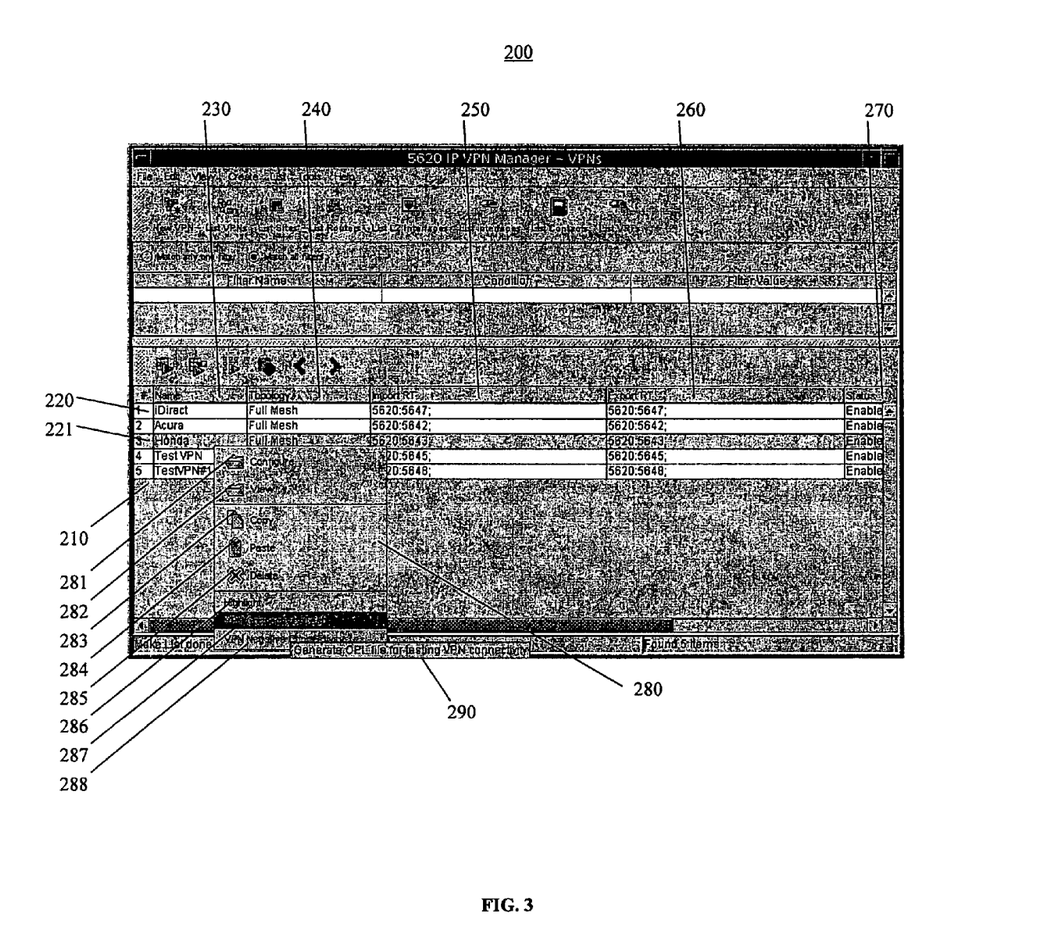
FIG. 3 is a screen capture of a VPN manager main window for a network management system ("NMS") in accordance with an embodiment of the invention.

FIG. 3 is a screen capture of a VPN manager main window 200 for a NMS 300 in accordance with an embodiment of the invention. The main window 200 is displayed on the display screen 340 of the NMS 300 as a part of that system's GUI 380. The main window 200 provides a list or choice 210 of VPNs. Each entry or row 220 in the list 210 has a number of fields or attributes including a name field 230 for identifying the name (e.g., "Honda" for row 221) of the respective VPN, a topology field 240 for identifying the topology type (e.g., "Full Mesh") of the respective VPN, an Import RT field 250 for identifying the import RT (e.g., "5620:5643") for the respective VPN, an Export RT field 260 for identifying the export RT (e.g., "5620: 5643"), and a status field for providing the status of the respective VPN (e.g., "Enabled").

Upon selecting a VPN (e.g., "Honda" 221) in the list 210, the user is presented with a pop-up menu 280 from which various functions may be selected relating to the selected VPN 221. The selected VPN 221 (i.e., "Honda") is highlighted within the list 210. The pop-up menu 280 may include a configure menu item 281 for opening a configuration menu or screen for the VPN 221, a view menu item 282 for opening a view of the VPN's configuration or layout, editing menu items (e.g., copy 283, paste 284, delete 285), a highlight menu item 286 for indicating that one or more VPNs have been selected, a VPN connectivity test menu item 287 for initiating a connectivity test, and a VPN negative connectivity test menu item 288 for initiating a negative connectivity test. In FIG. 3, the user has highlighted the VPN connectivity test menu item 287 in the pop-up menu 280, accordingly, a dialog box 290 is displayed indicating that upon selection of the VPN connectivity test menu item 287 a file will be generated for storing the results of a VPN connectivity test for the selected VPN 221 (i.e., "Honda").

Figure 4:
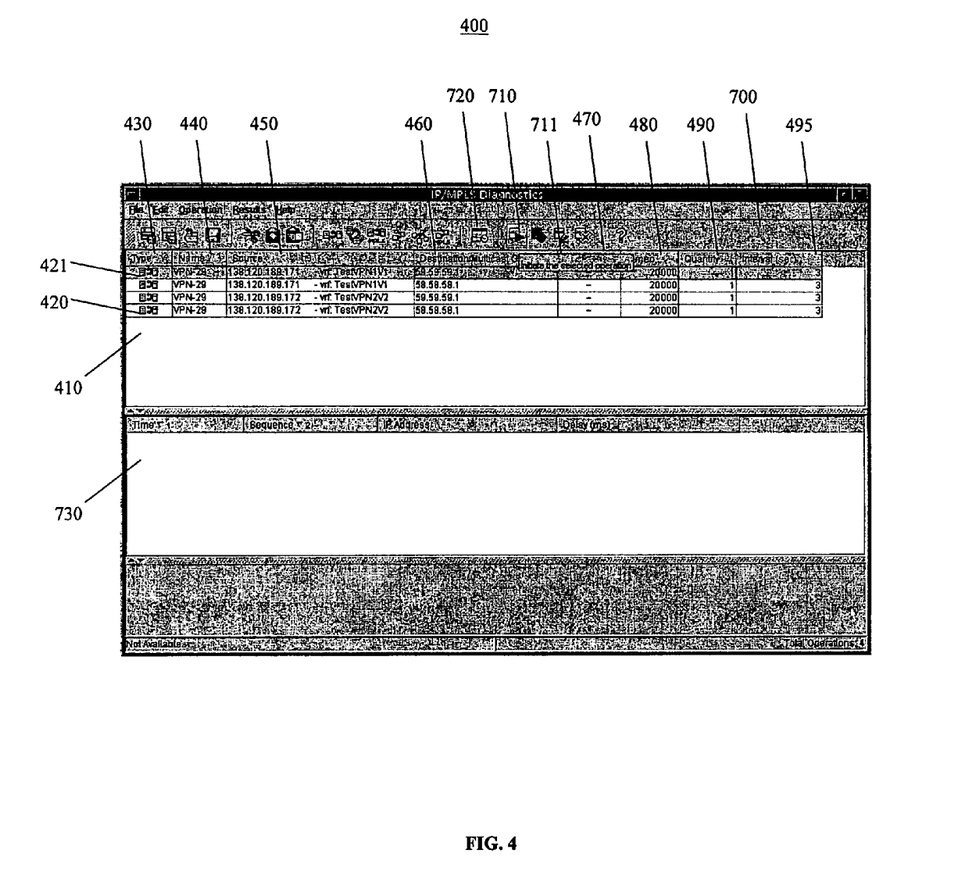
FIG. 4 is a screen capture of a VPN manager test initiation and scheduling window for a NMS in accordance with an embodiment of the invention.

FIG. 4 is a screen capture of a VPN manager test initiation and scheduling window 400 for a NMS 300 in accordance with an embodiment of the invention. Upon selecting the VPN connectivity test menu item 287, the VPN manager test initiation and scheduling window 400 is presented to the user on the display screen 340 of the NMS 300. The test initiation and scheduling window 400 provides a list or choice 410 of test operations for the selected VPN 221 (i.e., "Honda"). Each entry or row 420 in the list 410 has a number of fields or attributes. The type field 430 is for identifying an operation type. In the example of FIG. 4, the icons shown in the type field 430 indicate that each operation is a ping operation. The name field 440 is for identifying an ID for the selected VPN 221. In the example of FIG. 4, the ID for VPN 221 (i.e., "Honda") is shown as being "VPN-29". The source field 450 is for identifying which router in the VPN 221 is the source router for the test operation and which VRF is to be used. In the example of FIG. 4, the source router for the highlighted test operation 421 has an IP address of "138.120.189.171" and a VRF labelled "TestVPN1V1". The destination field 460 is for identifying a destination in the VPN 221 for the test operation. The destination may be another router or a multicast group. In the example of FIG. 4, the destination for the highlighted test operation 421 is a router having an IP address of "59.59.59.1". The status field 470 is for identifying the status of the test operation. The status may include "In Progress", "Complete", "Failed", and "-" indicating that the operation has not yet been initiated. The timeout field 480 is for identifying a timeout period for the test operation. In the example of FIG. 4, the timeout period for the highlighted test operation 421 is "20,000" units (e.g., seconds, milliseconds, etc.). The quantity field 490 is for identifying the number of repetitions of the test operation that will be performed. In the example of FIG. 4, the number of repetitions for the highlighted test operation 421 is "1". And, the interval field 495 is for identifying the interval between repetitions of the test operation. In the example of FIG. 4, the interval has been set to "3" seconds.

Upon selecting an operation, the selected operation (e.g., 421) is highlighted in the list 410. The user may now choose to initiate the selected test operation 421 in which case the selected test operation 421 will be performed immediately or to schedule the test operation 421 in which case the selected test operation 421 will be performed at a time specified by the user. To this end, the test initiation and scheduling window 400 has a toolbar 700 which includes a test initiation button 710 and a test scheduling button 720. In FIG. 4, the user has positioned the cursor 390 over the test initiation button 710 and hence a pop-up dialog box 711 informs the user that by selecting the button 710 the selected test operation 421 will be performed.

Upon selecting the test initiation button 710, the selected test operation 421 will be performed. The NMS 300 will send instructions to the source router (e.g., "138.120.189.171" in FIG. 4) to initiate a ping VRF operation with the identified destination router (e.g., "59.59.59.1" in FIG. 4) as its destination. The results of this test operation 421 will be reported to the NMS 300 which will present the results to the user via the status field 470 and via a status window 730. The results may also be stored in a file in the memory 330 of the NMS 300 for future use. The status window 730 may include fields for time, sequence, IP address, and delay relating to the results of the test operation 421.

Upon selecting the test scheduling button 720, the user may enter a time in a scheduling window (not shown) for designating when the selected test operation 421 will be performed. In this way, the user may create a schedule for performing all the tests required to complete a full connectivity or negative connectivity test for a selected VPN 221 or VPNs. According to one embodiment, the user may choose to have the selected test operation 421 repeated periodically (e.g., weekly, monthly, etc.).

Figure 5:
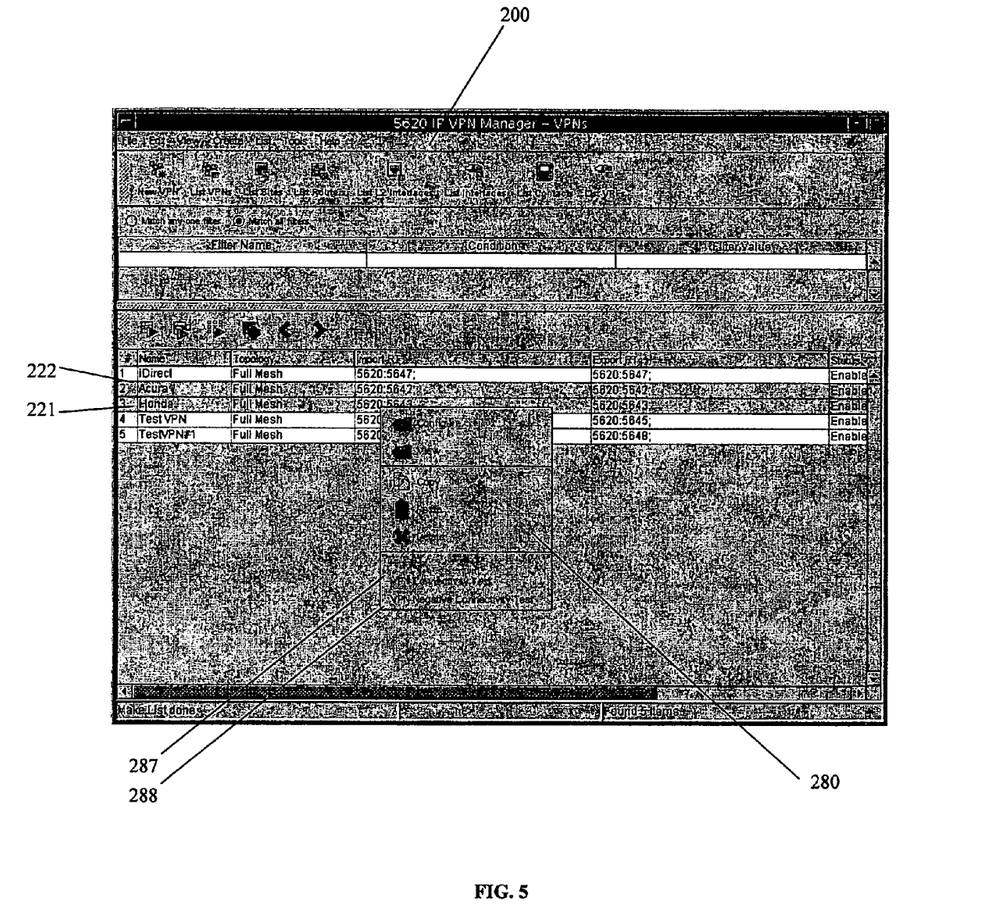
FIG. 5 is a screen capture of the VPN manager main window of FIG. 3 illustrating the selection of two VPNs in accordance with an embodiment of the invention; and, FIG. 6 is a flow chart illustrating operations of modules within the memory of a data processing system for testing connectivity of virtual private networks, the virtual private networks including customer edge routers and provider edge routers, the provider edge routers belonging to a network managed by a service provider, in accordance with an embodiment of the invention.

FIG. 5 is a screen capture of the VPN manager main window 200 of FIG. 3 illustrating the selection of two VPNs in accordance with an embodiment of the invention. In FIG. 5, two VPNs 221 (i.e., "Honda"), 222 (i.e., "Acura") have been selected by the user and are highlighted in the list 210. Accordingly, the pop-up menu 280 from which various functions may be selected relating to the selected VPNs 221, 222 makes the VPN negative connectivity test menu item 288 function available to the user. As two VPNs have been selected, the VPN connectivity test menu item 287 is not available to the user and is shown in a faded font in the pop-up menu 280. Recall that a negative connectivity test performs operations that confirm that two VPNs are not connected. Upon selecting the VPN negative connectivity test menu item 288, the user will be presented with the VPN manager test initiation and scheduling window 400 as described above.

According to one embodiment, the NMS 300 populates the lists 210, 410 of the main and initiation/scheduling windows 200, 400 through known configuration data for each VPN. According to another embodiment, a user may populate the lists 210, 420 by manual entry of data using the GUI 380 of the NMS 300.

The present invention provides several advantages. It provides for the automated testing of VPN services for connectivity. It provides for the automated testing of VPN services for "traffic leak" (i.e., negative connectivity) and thereby ensures the security of the VPN. And, by allowing for the periodic performance of tests, it allows SPs to monitor their VPNs for operational problems including security related problems.

Figure 6:
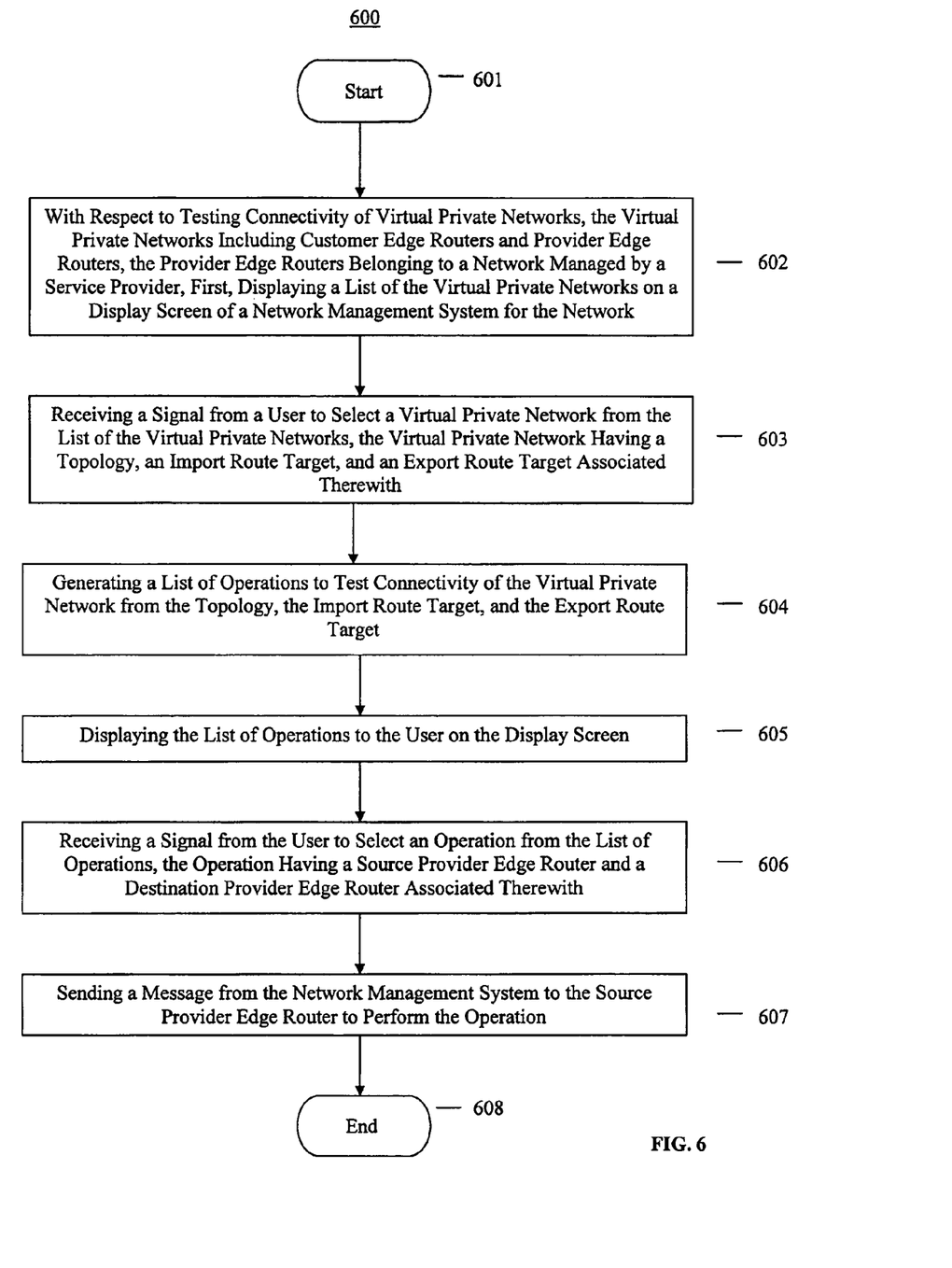

The above described method may be summarized with the aid of a flowchart. FIG. 6 is a flow chart illustrating operations 600 of modules 331 within the memory 330 of a data processing system 300 for testing connectivity of virtual private networks (e.g., 221, 222), the virtual private networks including customer edge routers (e.g., 120) and provider edge routers (e.g., 110, 111), the provider edge routers belonging to a network 150 managed by a service provider, in accordance with an embodiment of the invention.

At step 601, the operations 600 start.

At step 602, a list of the virtual private networks 210 is displayed on a display screen 340 of a network management system 300 for the network 150.

At step 603, a signal is received from a user to select a virtual private network (e.g., 221) from the list of the virtual private networks 210, the virtual private network 221 having a topology (e.g., "Full Mesh"), an import route target (e.g., "5620:5642"), and an export route target (e.g., "5620:5642") associated therewith.

At step 604, a list of operations 410 is generated to test connectivity of the virtual private network 221 from the topology, the import route target, and the export route target.

At step 605, the list of operations 410 is displayed to the user on the display screen 340.

At step 606, a signal is received from the user to select an operation (e.g., 421) from the list of operations 410, the operation 421 having a source provider edge router (e.g., "138.120.189.171") and a destination provider edge router (e.g., "59.59.59.1") associated therewith.

At step 607, a message is sent from the network management system 300 to the source provider edge router (e.g., "138.120.189.171") to perform the operation 421.

At step 608, the operations 600 end.

In the above method, the operation 421 may be a ping VRF operation. The method may further include receiving results 470, 730 of the operation 421 from the source provider edge router (e.g., "138.120.189.171") and displaying the results 470, 730 on the display screen 340 of the network management system 300. The method may further include receiving a signal from the user to initiate 710 the operation 421. The method may further include receiving a signal from the user to schedule initiation 720 of the operation 421. The virtual private network 421 may be a first virtual private network 421 and a second virtual private network 422 and the list of operations 410 to test connectivity of the virtual private network 421 may be a list of operations 410 to test negative connectivity between the first and second virtual private networks 421, 422. The topology may be one of a mesh topology and a hub and spoke topology. The virtual private networks may be Internet Protocol based virtual private networks (e.g., L3VPNs). And, the network management system 300 may be located remotely from the provider edge routers.

According to one embodiment of the invention, the above described method may be implemented by a router (e.g., 110, 120) rather than by the NMS 300.

While this invention is primarily discussed as a method, a person of ordinary skill in the art will understand that the apparatus discussed above with reference to a data processing system 300, may be programmed to enable the practice of the method of the invention. Moreover, an article of manufacture for use with a data processing system 300, such as a prerecorded storage device or other similar computer readable medium including program instructions recorded thereon, may direct the data processing system 300 to facilitate the practice of the method of the invention. It is understood that such apparatus and articles of manufacture also come within the scope of the invention.

In particular, the sequences of instructions which when executed cause the method described herein to be performed by the data processing system 300 of FIG. 2 can be contained in a data carrier product according to one embodiment of the invention. This data carrier product can be loaded into and run by the data processing system 300 of FIG. 2. In addition, the sequences of instructions which when executed cause the method described herein to be performed by the data processing system 300 of FIG. 2 can be contained in a computer software product according to one embodiment of the invention. This computer software product can be loaded into and run by the data processing system 300 of FIG. 2. Moreover, the sequences of instructions which when executed cause the method described herein to be performed by the data processing system 300 of FIG. 2 can be contained in an integrated circuit product (e.g., hardware modules) including a coprocessor or memory according to one embodiment of the invention. This integrated circuit product can be installed in the data processing system 300 of FIG. 2.

The embodiments of the invention described above are intended to be exemplary only. Those skilled in this art will understand that various modifications of detail may be made to these embodiments, all of which come within the scope of the invention.

What is claimed is:

1. A method for testing connectivity of virtual private networks, the virtual private networks including customer edge routers and provider edge routers, the provider edge routers belonging to a network managed by a service provider, the method comprising:

displaying a list of the virtual private networks on a display screen of a network management system for the network;

receiving a signal from a user to select at least one virtual private network from the list of the virtual private networks, the virtual private network having a topology, an import route target, and an export route target associated therewith;

generating a list of operations to test connectivity of the virtual private network from the topology, the import route target, and the export route target;

displaying the list of operations to the user on the display screen;

receiving a signal from the user to select an operation from the list of operations, the operation having a source provider edge router and a destination provider edge router associated therewith;

sending a message from the network management system to the source provider edge router to perform the operation; and performing the operation, wherein the displayed list of operations is a negative connectivity test menu only when the user selects more than one virtual private network, wherein the operation is a ping VPN Routing and Forwarding (VRF) operation that confirms there is no chance of a traffic leak when all outcomes of the ping VRF operation are failures during a negative connectivity test, but otherwise is a connectivity test menu and operations from said negative connectivity menu confirm whether traffic leaks exist between said virtual private networks, the traffic leaks defined as connections between said virtual private networks that are not authorized to be connected.

2. The method of claim 1, further comprising:

receiving results of the operation from the source provider edge router and displaying the results on the display screen of the network management system.

3. The method of claim 1, further comprising:
receiving a signal from the user to initiate the operation.

4. The method of claim 1, further comprising:
receiving a signal from the user to schedule initiation of the operation.

5. The method of claim 1, wherein the topology is one of a mesh topology and a hub and spoke topology.

6. The method of claim 1, wherein the virtual private networks are Internet Protocol based virtual private networks.

7. The method of claim 1, wherein the network management system is located remotely from the provider edge routers.

8. A system for testing connectivity of virtual private networks, the virtual private networks including customer edge routers and provider edge routers, the provider edge routers belonging to a network managed by a service provider with the system, the system comprising:
- a processor coupled to memory, a display screen, and an input device; and, modules within the memory and executed by the processor, the modules including: a module for displaying a list of the virtual private networks on the display screen;
- a module for receiving a signal from a user to select at least one virtual private network from the list of the virtual private networks, the virtual private network having a topology, an import route target, and an export route target associated therewith;
- a module for generating a list of operations to test connectivity of the virtual private network from the topology, the import route target, and the export route target;
- a module for displaying the list of operations to the user on the display screen;
- a module for receiving a signal from the user to select an operation from the list of operations, the operation having a source provider edge router and a destination provider edge router associated therewith;
- a module for sending a message from the system to the source provider edge router to perform the operation; and
- a module for performing the operation, wherein the displayed list of operations is a negative connectivity menu only when the user selects more than one virtual private network, wherein the operation is a ping VPN Routing and Forwarding (VRE) operation that confirms there is no chance of a traffic leak when all outcomes of the ping VRF operation are failures during a negative connectivity test, but otherwise is a connectivity test menu and operations from said negative connectivity test menu confirm whether traffic leaks exist between said virtual private networks, the traffic leaks defined as connections between said virtual so private networks that are not authorized to be connected.

9. The system of claim 8, further comprising:
a module for receiving results of the operation from the source provider edge router and displaying the results on the display screen.

10. The system of claim 8, further comprising:
a module for receiving a signal from the user to initiate the operation.

11. The system of claim 8, further comprising:
a module for receiving a signal from the user to schedule initiation of the operation.

12. The system of claim 8, wherein the topology is one of a mesh topology and a hub and spoke topology.

13. The system of claim 8, wherein the virtual private networks Internet Protocol based virtual private networks.

14. The system of claim 8, wherein the system is located remotely from the provider edge routers.

* * * * *

UNITED STATES PATENT AND TRADEMARK OFFICE
CERTIFICATE OF CORRECTION

PATENT NO. : 7,747,954 B2 Page 1 of 1
APPLICATION NO. : 11/386809
DATED : June 29, 2010
INVENTOR(S) : Hamdy Mahmoud Farid, Satvinder Singh Bawa and Susan Patricia Callow It is certified that error appears in the above-identified patent and that said Letters Patent is hereby corrected as shown below:

Claim 8, Column 18, line 10, change "(VRE)" to "(VRF)"

Claim 8, Column 18, line 17, delete "so"

Claim 13, Column 18, line 32, change "networks Internet Protocol" to "networks are Internet Protocol"

Signed and Sealed this

Seventeenth Day of August, 2010

David J. Kappos
*Director of the United States Patent and Trademark Office*